US012146860B2

(12) United States Patent
Ren

(10) Patent No.: US 12,146,860 B2
(45) Date of Patent: Nov. 19, 2024

(54) ELECTRO-MAGNETIC ACOUSTIC TRANSDUCER (EMAT) HAVING ELECTROMAGNET ARRAY FOR GENERATING CONFIGURABLE BIAS MAGNETIC FIELD PATTERNS

(71) Applicant: ULC Technologies, Hauppauge, NY (US)

(72) Inventor: Baiyang Ren, Hauppauge, NY (US)

(73) Assignee: ULC TECHNOLOGIES, Hauppauge, NY (US)

( * ) Notice: Subject to any disclaimer, the term of this patent is extended or adjusted under 35 U.S.C. 154(b) by 19 days.

(21) Appl. No.: 18/158,967

(22) Filed: Jan. 24, 2023

(65) Prior Publication Data

US 2023/0160858 A1 May 25, 2023

Related U.S. Application Data

(63) Continuation of application No. 16/863,455, filed on Apr. 30, 2020, now Pat. No. 11,561,205.

(51) Int. Cl.
*G01N 29/24* (2006.01)
*B06B 1/04* (2006.01)
*G01N 29/04* (2006.01)

(52) U.S. Cl.
CPC .......... *G01N 29/2412* (2013.01); *B06B 1/04* (2013.01); *G01N 29/041* (2013.01); *G01N 29/043* (2013.01); *B06B 2201/54* (2013.01); *G01N 2291/0422* (2013.01); *G01N 2291/0427* (2013.01)

(58) Field of Classification Search
CPC ............. G01N 29/2412; G01N 29/041; G01N 29/043; G01N 2291/0422; G01N 2291/0427; B06B 1/04; B06B 2201/54

USPC .......................................................... 73/643
See application file for complete search history.

(56) References Cited

U.S. PATENT DOCUMENTS

| 3,697,867 A | 10/1972 | Kleesattel |
| 4,127,035 A | 11/1978 | Vasile |
| 4,248,092 A | 2/1981 | Vasile et al. |
| 4,295,214 A | 10/1981 | Thompson |
| 4,471,658 A | 9/1984 | Morimoto |
| 5,747,986 A | 5/1998 | Hristoforou |
| 7,697,375 B2 | 4/2010 | Reiderman et al. |
| 2006/0027022 A1 | 2/2006 | Flora et al. |
| 2007/0211572 A1 | 9/2007 | Reiderman et al. |
| 2008/0160639 A1 | 7/2008 | Su et al. |

(Continued)

FOREIGN PATENT DOCUMENTS

| JP | 2006329868 A | * 12/2006 |
| JP | 2010237093 A | 10/2010 |

OTHER PUBLICATIONS

JP-2006329868 with machine translation (Year: 2006).*

*Primary Examiner* — John E Breene
*Assistant Examiner* — Rose M Miller
(74) *Attorney, Agent, or Firm* — Husch Blackwell LLP

(57) ABSTRACT

An electro-magnetic acoustic transducer (EMAT) system and method for controlling the EMAT system are provided. The system includes an electromagnet array with one or more electromagnets. Each electromagnet includes a magnetic core and a wound coil wrapped around the magnetic core. The electromagnet array generates bias magnetic fields having different patterns when the wound coils are energized differently.

16 Claims, 8 Drawing Sheets

(56) References Cited

U.S. PATENT DOCUMENTS

| | | |
|---|---|---|
| 2012/0103097 A1 | 5/2012 | Jauregui |
| 2016/0225507 A1 | 8/2016 | Catalan |
| 2017/0299554 A1 | 10/2017 | Bondurant et al. |
| 2019/0094184 A1 | 3/2019 | Ren et al. |

* cited by examiner

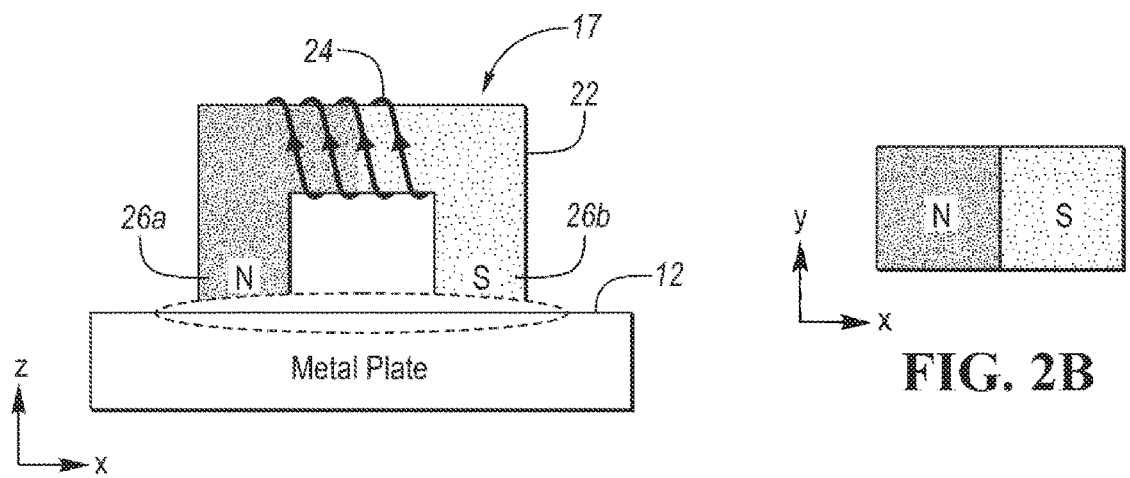
FIG. 2A
FIG. 2B
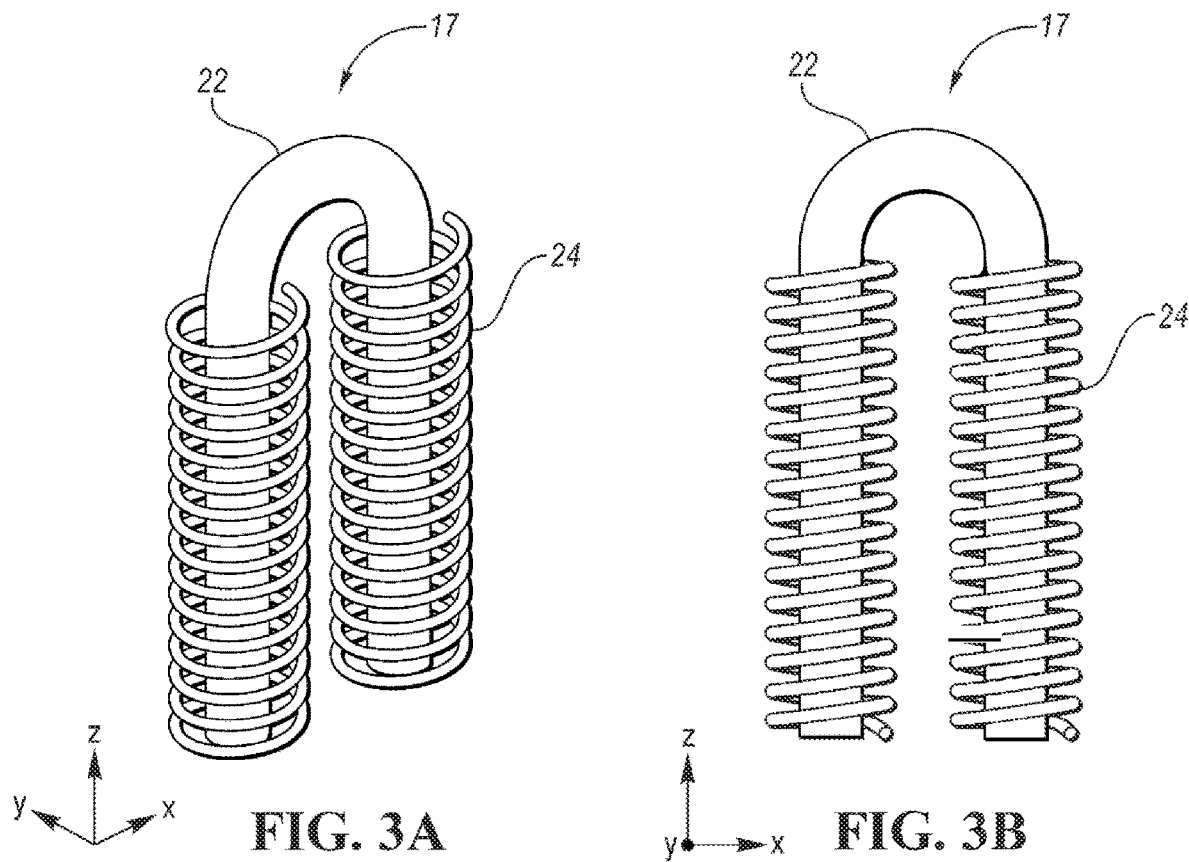
FIG. 3A
FIG. 3B

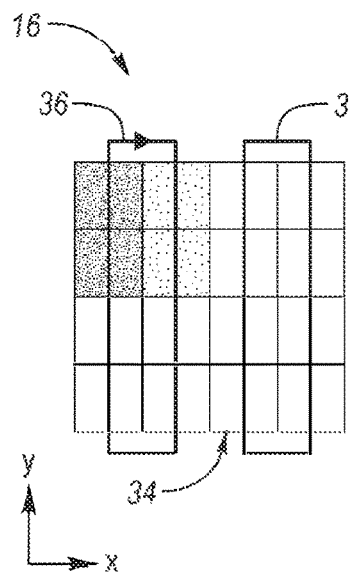
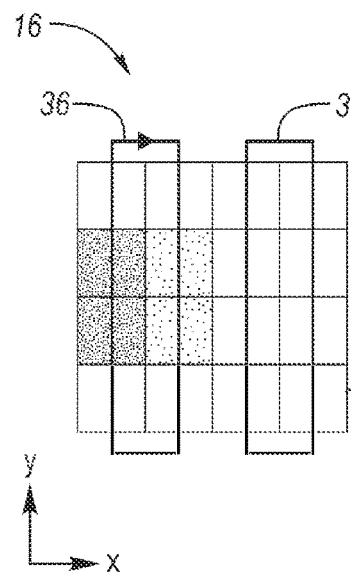
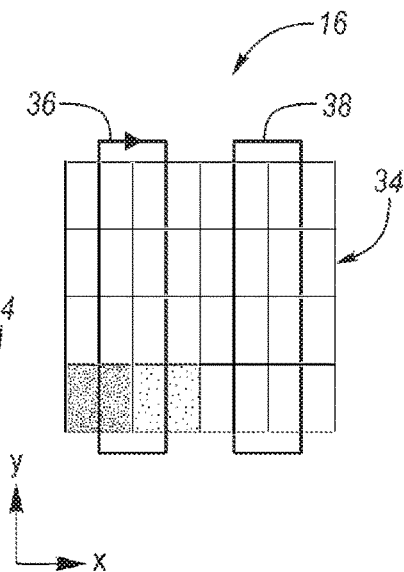
FIG. 9A  FIG. 9B  FIG. 9C
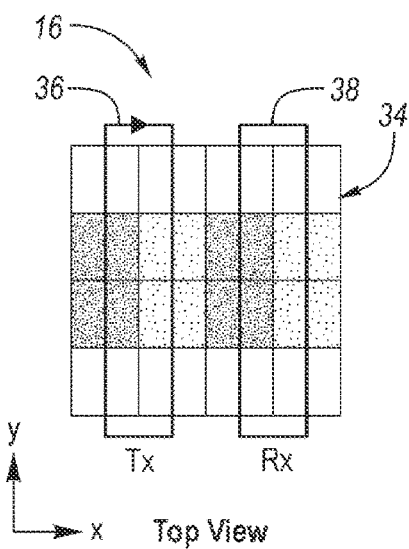
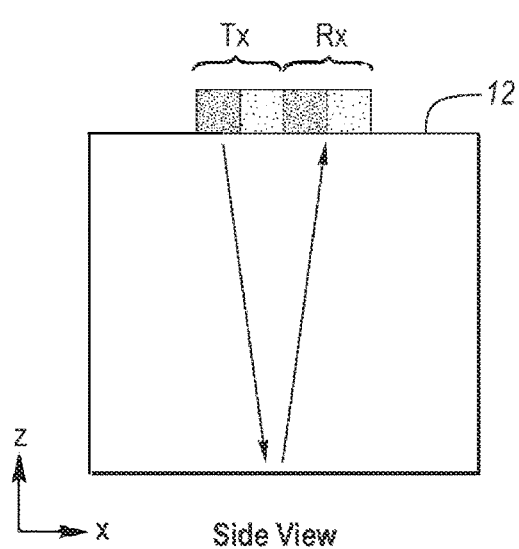
FIG. 10A  FIG. 10B

ELECTRO-MAGNETIC ACOUSTIC TRANSDUCER (EMAT) HAVING ELECTROMAGNET ARRAY FOR GENERATING CONFIGURABLE BIAS MAGNETIC FIELD PATTERNS

RELATED APPLICATIONS

This application is a continuation of U.S. patent application Ser. No. 16/863,455 filed on Apr. 30, 2020, all of the disclosure of which is incorporated by reference herein in its entirety.

TECHNICAL FIELD

The present invention relates to electro-magnetic acoustic transducers (EMATs).

BACKGROUND

An electro-magnetic acoustic transducer (EMAT) is a transducer (i.e., sensor) for non-contact, acoustic (i.e., ultrasonic) wave generation and reception in metallic targets. EMATs are used for in-line inspection and non-destructive testing of metallic targets.

An EMAT requires a bias magnetic field to operate. Particularly, an EMAT requires a bias magnetic field having a particular pattern (i.e., shape, field lines, etc.) for the EMAT to transmit a corresponding type of ultrasonic wave. For instance, an EMAT requires a bias magnetic field having a certain pattern for the EMAT to transmit a Lamb wave, a bias magnetic field having a different pattern for the EMAT to transmit a shear-horizontal (SH) wave, a bias magnetic field having a different pattern for the EMAT to transmit a shear-bulk wave, etc. An EMAT typically includes permanent magnets fixed in a specific configuration (i.e., a fixed permanent magnet array) to generate a bias magnetic field having a given pattern for the EMAT to transmit the corresponding type of ultrasonic wave.

SUMMARY

Some embodiments of the invention can provide an electro-magnetic acoustic transducer (EMAT) system comprising an electromagnet array including an electromagnet with a magnetic core. The system can include a power supply connected to a wound coil wrapped around the magnetic core of the electromagnet. The system can also include a first bias magnetic field generated by the electromagnet array when the wound coil is energized with a first current from the power supply and a second bias magnetic field generated by the electromagnet array when the wound coil is energized with a second current from the power supply. In some embodiments, the power supply can include a direct current (DC) power supply and an alternating current (AC) power supply. In some embodiments, the system can also include a controller in communication with the power supply, wherein the controller is designed to control an output power operation including the first current and the second current used to energize the wound coil. In some embodiments, the magnetic core of the electromagnet can include a first pole and a second pole facing a common plane, with a square footprint, and/or with a rectangular footprint. In some embodiments, first current can be a positive electric current and the second current can be a negative electric current. In some embodiments, the magnetic core of the electromagnet can include a first pole and a second pole designed to conform to a curvature of a non-planar surface or form an arc segment conforming to a curvature of a non-planar surface.

Some embodiments of the invention can provide a method of controlling EMAT system. A power supply of the EMAT system can be used to energize a wound coil wrapped around a magnetic core of an electromagnet of an electromagnet array. The method can include providing a first current at a first time to the wound coil using the power supply and generating a first bias magnetic field based on the first current. The method can also include providing a second current at a second time to the wound coil using the power supply and generating a second bias magnetic field based on the second current. In some embodiments, the method can further include controlling the first current and the second current using a controller of the EMAT system. In some embodiments, a first and second ultrasonic wave can be generated based on the first and second bias magnetic field, respectively. In some embodiments, energizing the wound coil with the first current causes a first pole and a second pole of the magnetic core to have a checkerboard magnetic polarization pattern. In some embodiments, energizing the wound coil with the second current causes a first pole and a second pole of the magnetic core to have a non-checkerboard magnetic polarization pattern. In some embodiments, the first current is a negative current and the second current is a positive current.

Some embodiments provide an EMAT system including an electromagnetic array having one or more electromagnets arranged in rows, each including a magnetic core wrapped in a wound coil. Each magnetic core can also include a first pole and a second pole arranged adjacently in a row of the electromagnet. The system can also include a power supply designed to energize the wound coil and an electrical coil with a first leg and a second leg aligned relative to the first and second poles of the magnetic core or each of the one or more electromagnets. In some embodiments, the first leg of the electrical coil extends over the rows across the first poles of the electromagnets and the second leg of the electrical coil extends over the rows across the second poles of the electromagnets. In some embodiments, the first pole of the magnetic core is configured to have a north magnetic polarization when the power supply provides a first current and a south magnetic polarization when the power supply provides a second current, wherein the first current is opposite in polarity to the second current.

BRIEF DESCRIPTION OF THE DRAWINGS

FIG. 2A illustrates a schematic diagram of an electromagnet of an electromagnet array of the EMAT, the electromagnet being a U-shaped electromagnet;

FIG. 2B illustrates a schematic diagram of the associated magnetic polarization of the electromagnet shown in FIG. 2A;

FIG. 3A illustrates a perspective view of the electromagnet;

FIG. 3B illustrates a frontal view of the electromagnet;

FIGS. 9A, 9B, and 9C illustrate schematic diagrams of the EMAT in operation to transmit shear-bulk waves at different locations and/or with different beam widths;

FIGS. 10A and 10B illustrate respective schematic diagrams of the EMAT in operation to transmit a shear-bulk wave and to receive any reflected-back portion of the shear-bulk wave;

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
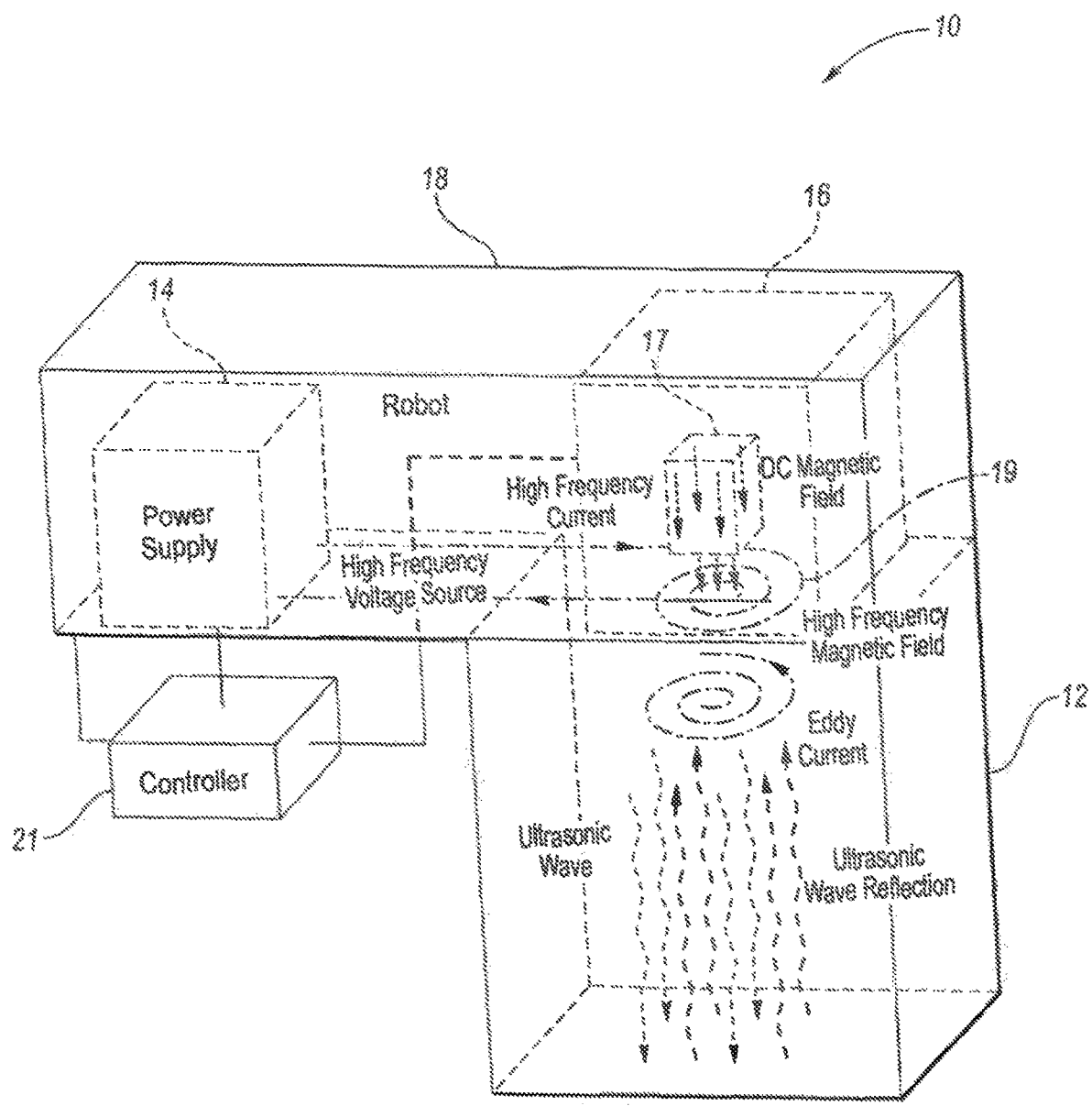
FIG. 1 illustrates a block diagram of an exemplary system having an electromagnetic acoustic transducer (EMAT) in accordance with embodiments for ultrasonic inspection of a pipe.

Referring now to FIG. 1, a block diagram of an exemplary system 10 having an electromagnetic acoustic transducer (EMAT) 16 in accordance with embodiments for ultrasonic inspection of a part to be inspected is shown. The part to be inspected is in the form of a pipe 12. System 10 further includes a power supply 14 and a robot 18. Power supply 14 is for powering EMAT 16. Power supply 14 and EMAT 16 are mounted on robot 18. Robot 18 can access (e.g., move throughout and physically against/near) pipe 12.

EMAT 16 includes an electromagnet array having one or more electromagnets 17 (only one shown in FIG. 1) and an electrical coil 19. Each electromagnet has a magnetic core and a wound coil wrapped around the magnetic core (not shown in FIG. 1). Power supply 14 is connected to the wound coils of electromagnets 17 and is connected to electrical coil 19. More particularly, power supply 14 includes (i) a DC power supply for connected to the wound coils of electromagnets 17 for supplying DC power (i.e., 0 Hz frequency) to the wound coils of the electromagnets and (ii) an AC power supply connected to electrical coil 19 for supplying AC power (e.g., high-frequency) to the electrical coil. Power supply 14 selectively outputs electrical power to the wound coils to energize electromagnet array in a given manner to generate a bias magnetic field and outputs electrical power to electrical coil 19 which thereby cause EMAT 16 to transmit an ultrasound in pipe 12. The ultrasound travels through pipe 12 and a portion of the ultrasound may reflect backward to EMAT 16.

A controller 21 (e.g., an electronic processor such as a computer) in communication with EMAT 16 detects wall thickness, wall loss, and defects such as cracks of pipe 12 based on the transmitted and received ultrasound. Controller 21 is further in communication with power supply 14 to control its operation in outputting power to EMAT 16. Controller 21 is further in communication with robot 18 to control its operation.

Referring now to FIG. 2A, a schematic diagram of one electromagnet 17 of the electromagnet array of EMAT 16 is shown. EMAT 16 is positioned near a part 12, such as a metal plate, that is to be inspected by the EMAT. Electromagnet 17 is a U-shaped electromagnet having a U-shaped magnetic core 22. Electromagnet 17 further includes a wound coil 24 wrapped around magnetic core 22. Wound coil 24 is an electrically insulated wire that is wrapped around magnetic core one or more times. Magnetic core 22 includes first and second poles 26a and 26b. In correspondence with the U-shape of magnetic core 22, poles 26a and 26b face in the same direction toward to-be-inspected part 12.

An electric current injected into wound coil 24 causes poles 26a and 26b to have opposite magnetic polarizations. Particularly, an electric current of one polarity injected into wound coil 24 causes poles 26a and 26b to respectively have north ("N") and south ("S") magnetic polarizations. In this case, first pole 26a has a N magnetic polarization and second pole 26b has a S magnetic polarization. Conversely, an electric current of an opposite polarity injected into wound coil 24 causes poles 26a and 26b to have S and N magnetic polarizations. In this case, first pole 26a has a S magnetic polarization and second pole 26b has a N magnetic polarization.

For instance, as shown in FIG. 2A, a negative DC electric current (i.e., an electric current of one polarity) injected into wound coil 24 causes poles 26a and 26b to respectively have N and S magnetic polarizations. FIG. 2B illustrates a schematic diagram of the associated magnetic polarization of electromagnet 17 in this case. A positive DC electric current (i.e., an electric current of an opposite polarity) injected into wound coil 24 causes poles 26a and 26b to respectively have S and N magnetic polarizations.

As such, the orientation of the N-S magnetic polarizations of electromagnet 17 depends on the direction of the electric current flowing in wound coil 24 of the electromagnet. Thus, the magnetic polarizations of electromagnet can be swapped by changing the direction of the electric flowing in wound coil 24.

Electromagnet 17 generates a magnetic field (i.e., a bias magnetic field) according to the polarizations of electromagnet 17. To-be-inspected part 12 is magnetized by the magnetic field such that the top surface of the part has the simplified distribution shown in FIG. 2B.

FIGS. 3A and 3B illustrate perspective and frontal views of electromagnet 17. Of course, the two toroid windings illustrated in each of FIGS. 3A and 3B belong to the single wound coil 24 of electromagnet 17. The toroid windings are always constructively enhancing the magnetic field along the U-shaped electromagnet.

Figure 4:
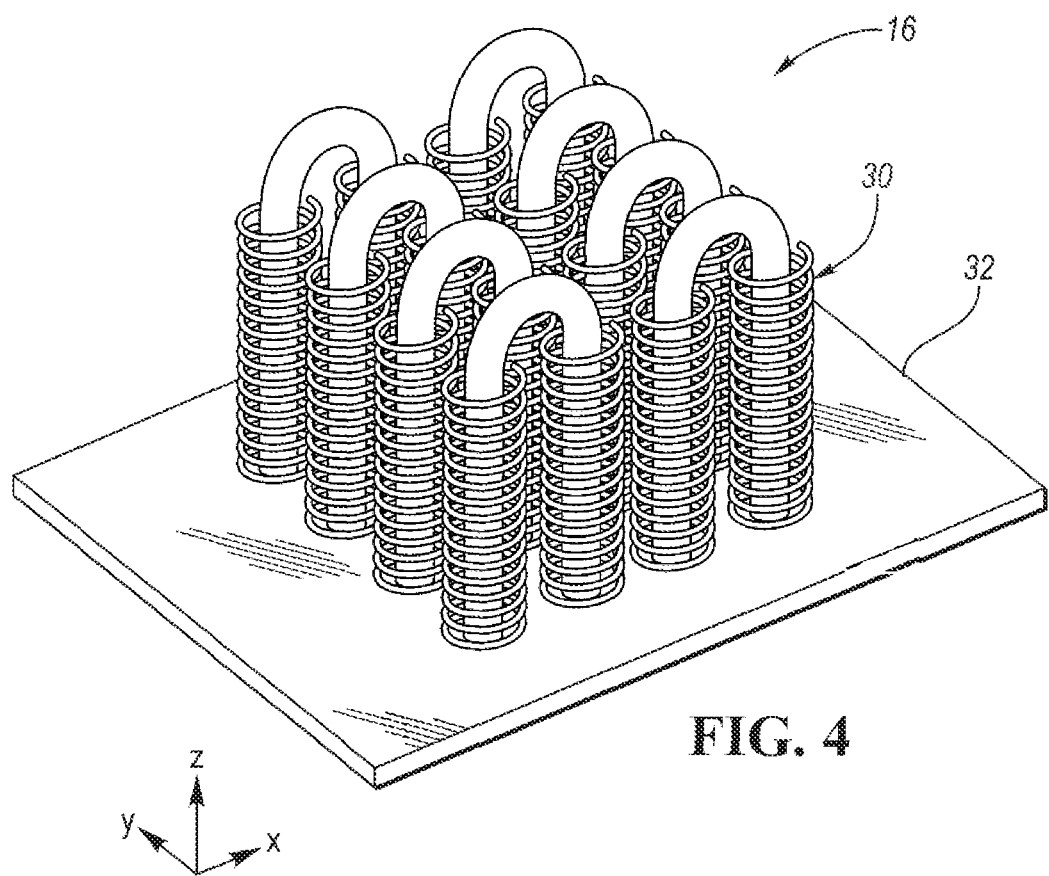
FIG. 4 illustrates a perspective view of the EMAT with the electromagnet array, having a plurality of the electromagnets, arranged adjacent to one side of a printed circuit board (PCB) of the EMAT.

Referring now to FIG. 4, with continual reference to FIGS. 2A, 2B, 3A, and 3B, a perspective view of EMAT 16 is shown. The electromagnet array of EMAT is an electromagnet array 30 having a plurality of electromagnets 17. EMAT 16 further includes a printed circuit board (PCB) 32. Electromagnet array 30 is arranged adjacent to one side of PCB 32.

Figure 5:
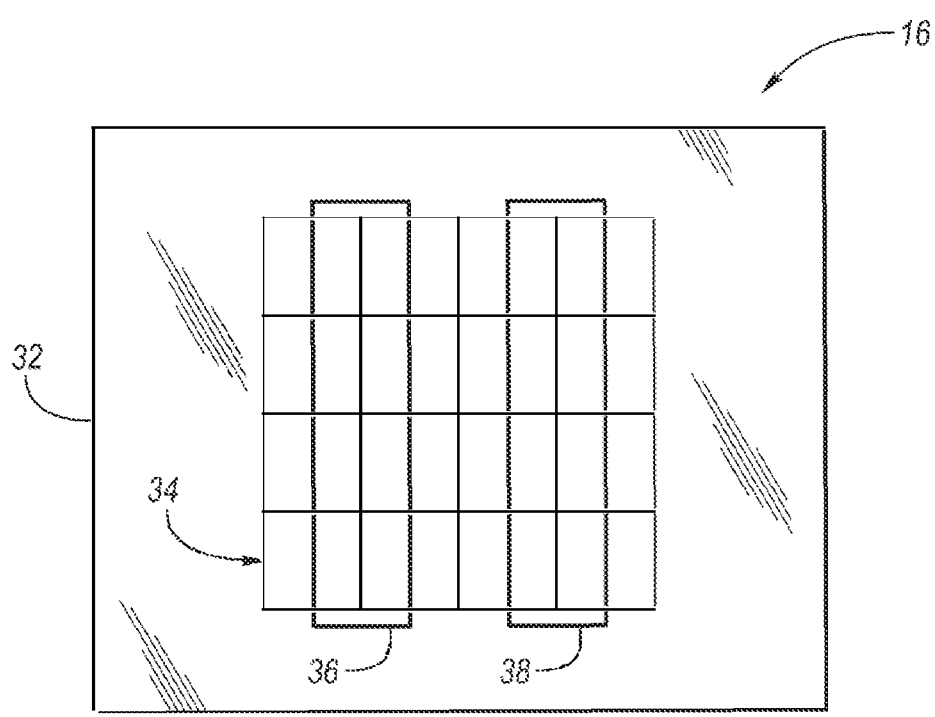
FIG. 5 illustrates a schematic diagram of the EMAT, the EMAT having electrical coils in addition to the electromagnet array and the PCB, the schematic diagram of FIG. 5 illustrating the electrical coils on the PCB and the placement of the electrical coils relative to the electromagnet array.

Referring now to FIG. 5, with continual reference to FIGS. 2A, 2B, 3A, 3B, and 4, a schematic diagram of EMAT 16 is shown. Electromagnet array 30 is not in view in FIG. 5 as the electromagnet array is underneath PCB 32 in this view. In like manner of FIG. 2B, grid pattern 34 designates the arrangement including the locations and magnetic polarizations of the poles of electromagnets 17 of electromagnet array 30.

In addition to electromagnet array 30 and PCB 32, EMAT 16 further includes first and second electrical coils 36 and 38. Electrical coils 36 and 38 are on (i.e., a part of) PCB 32. In embodiments, electrical coils 36 and/or 38 are looped coils and/or meander coils. The placement of electrical coils 36 and 38 relative to electromagnet array 30 (i.e., relative to grid pattern 34) is also shown in FIG. 5.

Electromagnet array 30 can create a configurable bias magnetic field arrangement for EMAT 16 using electromagnets 17. The configuration of the bias magnetic field arrangement is composed by controlling the direction flowing in wound coils 24 of electromagnets 17. Examples of magnetic field arrangements which allow a single, two electrical coil EMAT to generate specific ultrasonic waves will now be described with reference to the remaining Figures.

Figure 6A:
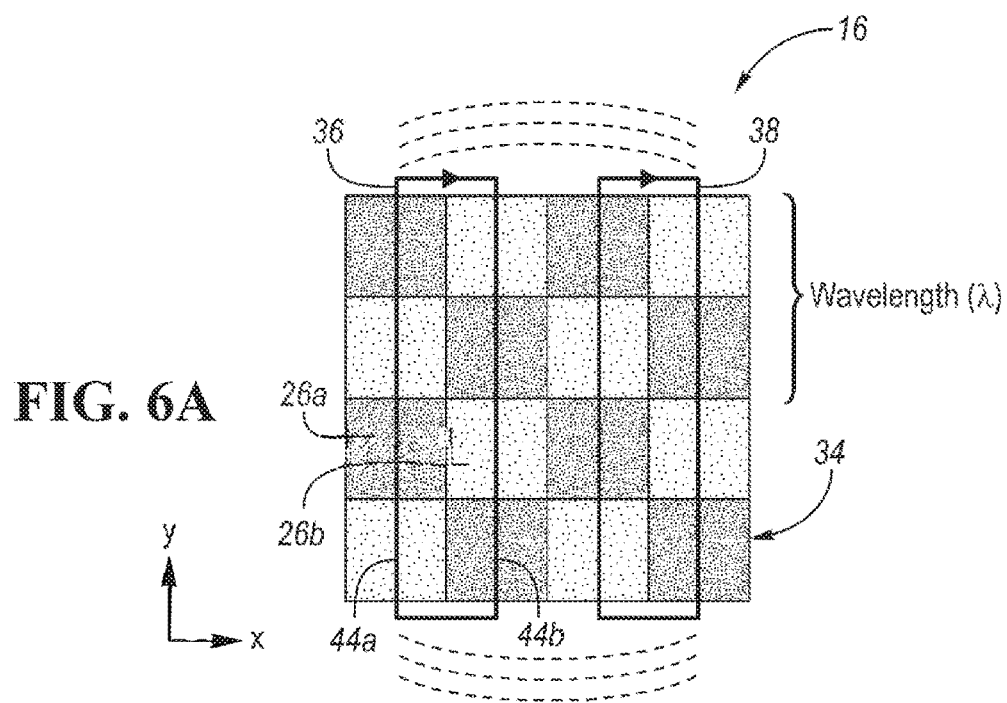
FIG. 6A illustrates a schematic diagram of the EMAT in operation to transmit a shear-horizontal wave.
Figure 6B:
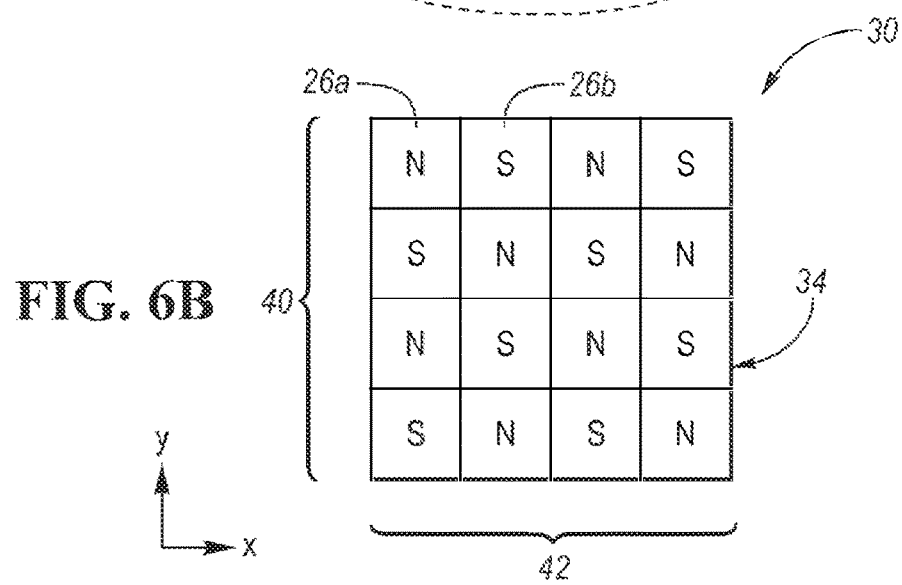
FIG. 6B illustrates a schematic diagram of an arrangement of the magnetic polarizations of the electromagnets for the electromagnet array to generate a bias magnetic field having a particular pattern required by the EMAT for the EMAT to use to transmit the shear-horizontal wave.
Figure 6C:
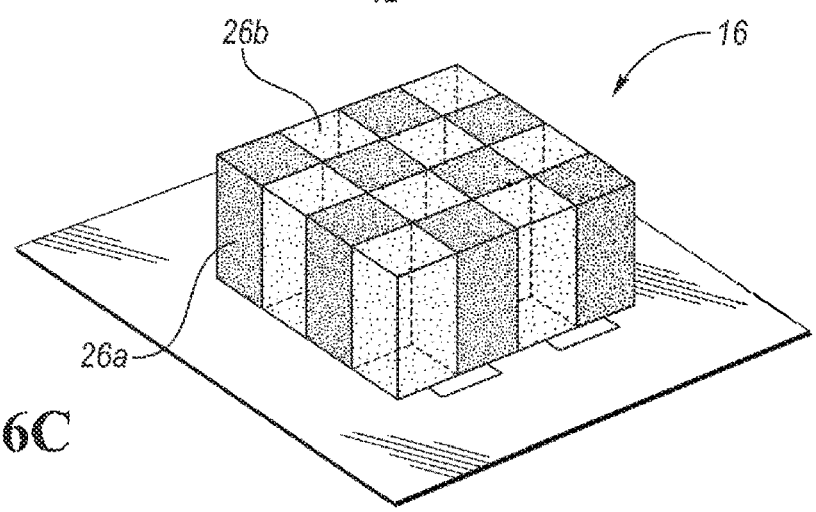
FIG. 6C illustrates an illustrative view of the magnetic polarizations of the electromagnets shown in FIG. 6B.

Referring now to FIGS. 6A, 6B, and 6C, with continual reference to FIGS. 4 and 5, the magnetic field arrangement for EMAT 16 to generate a shear-horizontal wave for transmission will be described. FIG. 6A illustrates a schematic diagram of EMAT 16 in operation to transmit a shear-horizontal wave. FIG. 6B illustrates a schematic diagram of an arrangement of the magnetic polarizations of electromagnets 17 for electromagnet array 30 to generate a bias magnetic field having a particular pattern required by EMAT 16 for the EMAT to use to transmit the shear-horizontal wave. FIG. 6C illustrates an illustrative view of the magnetic polarizations of electromagnets 17 shown in FIG. 6B.

As noted above, grid pattern 34 designates the magnetic polarizations of poles 26a and 26b of electromagnets 17 of electromagnet array 30. In this magnetic field arrangement for EMAT 16 to transmit a shear-horizontal wave, poles 26a and 26b of electromagnets have alternating magnetic polarizations (i.e., poles 26a have N magnetic polarization and poles 26b have S magnetic polarization) forming a checkerboard pattern.

Grid pattern 34 includes rows 40 and columns 42 consistent with the layout of the poles of electromagnets 17. (It is to be understood that the terminology "row" and "column" are interchangeable; that is, row(s) and column(s) may actually be column(s) and row(s), respectively.) As shown in FIG. 4, electromagnet array 30 includes a 4×2 layout of electromagnets 17 and each electromagnet has two poles 26a and 26b (i.e., 4×4 layout of electromagnet poles). Thus, in this example, grid pattern 34 includes four rows 40 and four columns 42. Each row/column pair (e.g., (x2, y1), (x1, y3), etc.) of grid pattern 34 defines a respective space of the grid. Poles 26a and 26b of each electromagnet 17 correspond to adjacent spaces (e.g., adjacent spaces in the same row) of grid pattern 34. The magnetic polarizations of the poles of electromagnets 17 are in the out-of-page direction.

Further, the grids of grid pattern 34 have a square footprint which approximately corresponds to the perimeter of the poles of electromagnets 17. The poles of electromagnets 17 may have square, rectangular, or circular footprints. This could mean, for instance, that the poles of some of electromagnets 17 have rectangular footprints and the poles of other ones of electromagnets 17 have square footprints.

Further, the poles of the magnetic cores of the electromagnets may be shaped to conform to a curvature of a non-planar surface or form an arc segment conforming to a curvature of a non-planar surface. As such, EMAT 16 may be shaped to conform to the curvature of an inner pipe wall or may be shaped to conform to an opposite curvature of an outer pipe wall. PCB 32 and electrical coils 36 and 38 are likewise shaped to conform to the curvature of the non-planar surface. EMAT 16 having its electromagnet array 30, PCB 32, and electrical coils 36 and 38 conformed to a curved surface provides minimal clearance between the EMAT and the curved surface and hence maximizes the strength of the electromagnetic field that interacts with the non-planar material. Ultimately, this results in the production of a stronger guided wave and higher signal-to-noise ratio.

Herein, as a convention, rows 40 of grid pattern 34 run along the x-direction and columns 42 run along the y-direction. Further, as described in greater detail herein, the y-direction is the wave propagation direction and the x-direction is the in-plane transverse direction.

In sum, electromagnet array 30 includes electromagnets 17 arranged in rows and columns with the poles of the electromagnets placed at corresponding row/column pairs. Rows of electromagnets are separated from neighboring rows of electromagnets along horizontal interfaces or boundaries. Similarly, columns of electromagnets are separated from neighboring columns of electromagnets along vertical interfaces or boundaries.

As shown in FIG. 6A, and consistent with FIG. 5, each electrical coil 36 and 38 has a pair of opposed long, straight legs 44a and 44b running in the x-direction across the entire electromagnet array 30. The placement of first and second electrical coils 36 and 38 relative to electromagnet array 17 is such that the legs of the electrical coils are positioned along a center line of a respective column of poles of the electromagnets of the electromagnet array. Put another way, each legs of each electrical coil extends across the poles located in respective columns of grid pattern 34.

As noted, in this magnetic field arrangement for EMAT 16 to transmit a shear-horizontal wave, poles 26a and 26b of electromagnets have alternating magnetic polarizations (i.e., poles 26a have N magnetic polarization and poles 26b have S magnetic polarization) forming a checkerboard pattern. With this magnetic polarization checkerboard pattern, electromagnet array 30 thereby generates the bias magnetic field having the requisite pattern enabling EMAT 16 to transmit the shear-horizontal wave. In turn, first and second electrical coils 36 and 38 are pulsed with alternating current of the same frequency, amplitude, and phase. The resultant ultrasonic wave transmitted by EMAT 16 is a shear-horizontal wave propagating in the y-direction.

Further, as indicated in FIG. 6A, the shear-horizontal wave has a wavelength which corresponds to the length in the y-direction of two rows of the poles of the electromagnets of electromagnet array 30.

Figure 7A:
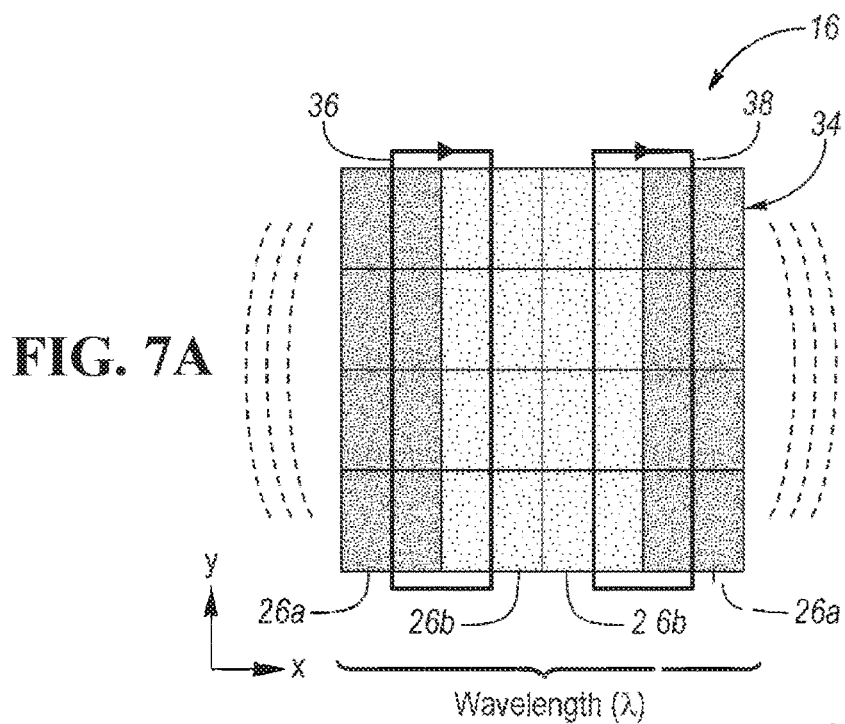
FIG. 7A illustrates a schematic diagram of the EMAT in operation to transmit a Lamb wave.
Figure 7B:
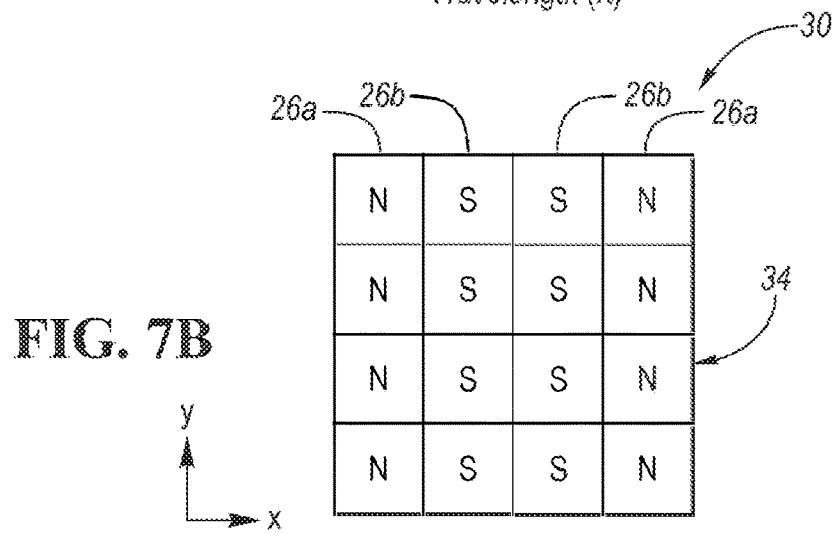
FIG. 7B illustrates a schematic diagram of another arrangement of the magnetic polarizations of the electromagnets for the electromagnet array to generate a bias magnetic field having a different pattern required by the EMAT for the EMAT to use to transmit the Lamb wave.
Figure 7C:
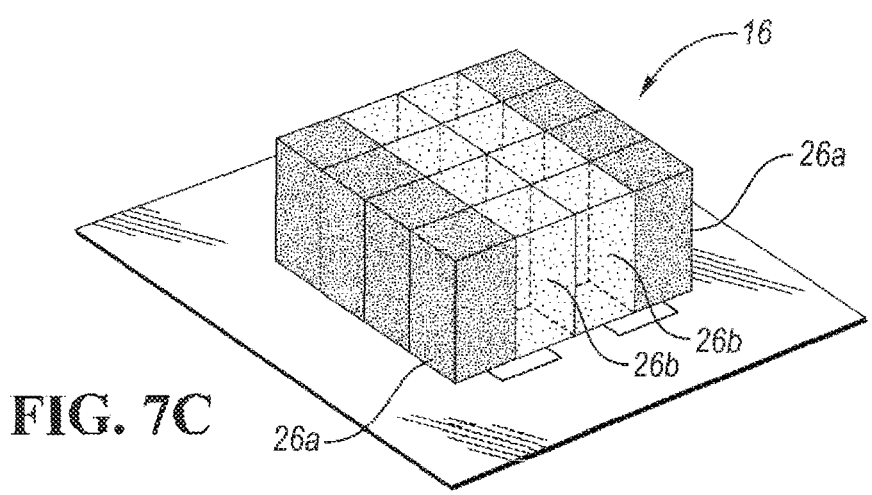
FIG. 7C illustrates an illustrative view of the magnetic polarizations of the electromagnets shown in FIG. 7B.

Referring now to FIGS. 7A, 7B, and 7C, with continual reference to FIGS. 4, 5, 6A, 6B, and 6C, the magnetic field arrangement for EMAT 16 to generate a Lamb wave for transmission will be described. FIG. 7A illustrates a schematic diagram of EMAT 16 in operation to transmit a Lamb wave. FIG. 7B illustrates a schematic diagram of the arrangement of the magnetic polarizations of electromagnets 17 for electromagnet array 30 to generate a bias magnetic field having a different pattern required by EMAT 16 for the EMAT to use to transmit the Lamb wave. FIG. 7C illustrates an illustrative view of the magnetic polarizations of electromagnets 17 shown in FIG. 7B.

In the magnetic field arrangement for EMAT 16 to transmit a Lamb wave, each column of poles have the same magnetic polarization according to a N-S-S-N pattern, as indicated in FIGS. 7A, 7B, and 7C. As such, for first and second electromagnets 17 in each row, first pole 26a of the first electromagnet has a N magnetic polarization, second pole 26b of the first electromagnet has a S magnetic polarization, first pole 26a of the second electromagnet has a S magnetic polarization, and second pole 26b of the second electromagnet has a N magnetic polarization. With this magnetic polarization pattern, electromagnet array 30 thereby generates the bias magnetic field having the requisite pattern enabling EMAT 16 to transmit the Lamb wave. In turn, first and second electrical coils 36 and 38 are pulsed with alternating current of the same frequency, amplitude, and phase. The resultant ultrasonic wave transmitted by EMAT 16 is a Lamb wave propagating in the x-direction.

Further, as indicated in FIG. 7A, the Lamb wave has a wavelength which corresponds to the width in the x-direction of the columns of the poles of the electromagnets of electromagnet array 30.

For both of the shear-horizontal wave and Lamb wave examples subject of FIGS. 6A, 6B, 6C, 7A, 7B, and 7C, as well as for other ultrasonic wave transmissions, electromagnet array 30 may have more or less electromagnets 17 and/or EMAT may have just one electrical coil or more than two electrical coils.

Figure 8A:
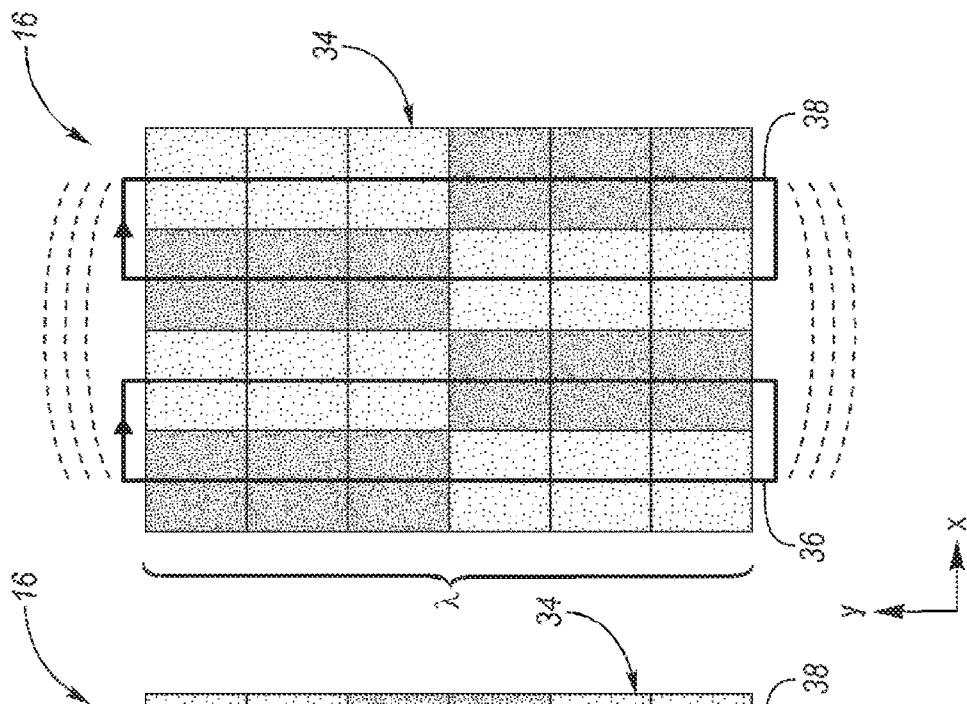
FIGS. 8A, 8B, and 8C illustrate schematic diagrams of the EMAT in operation to transmit shear-horizontal waves having different wavelengths.
Figure 8B:
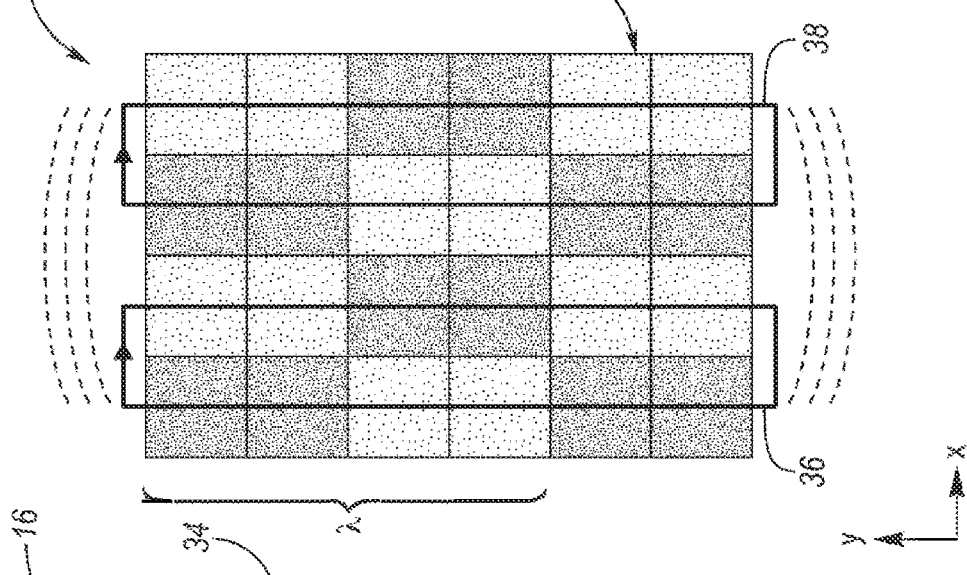
Figure 8C:
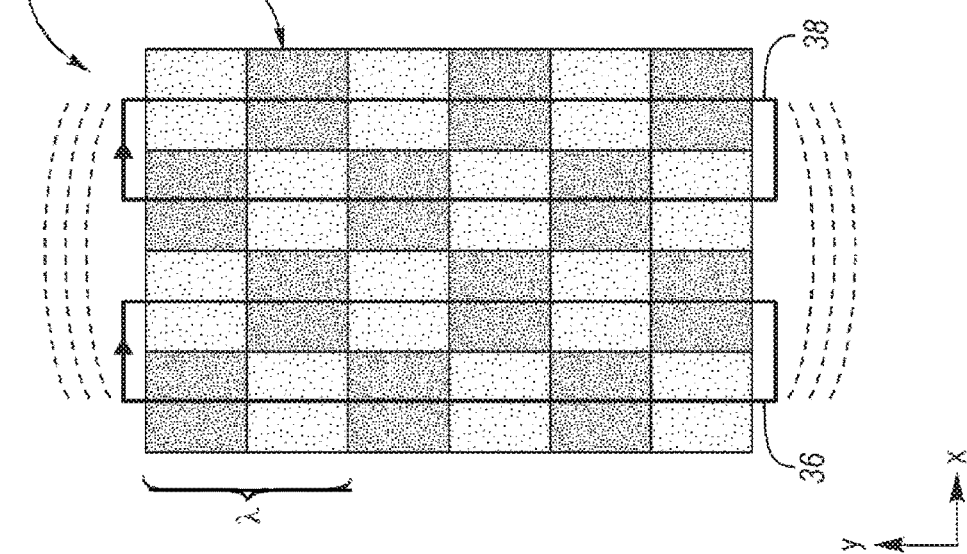

Referring now to FIGS. 8A, 8B, and 8C, with continual reference to FIG. 6A, schematic diagrams of EMAT 16 in operation to transmit shear-horizontal waves having different wavelengths are shown. Compared with FIG. 6A, electromagnet array 30 in FIGS. 8A, 8B, and 8C includes two additional rows of electromagnets (i.e., 6×2 array of electromagnets; or 6×4 array of electromagnet poles).

The magnetic polarization checkerboard pattern shown in FIG. 8A is the same magnetic polarization checkerboard pattern shown in FIG. 6A with the two additional rows of electromagnets. In FIG. 8B, the magnetic polarization checkerboard pattern is extended by an additional row compared with the magnetic polarization checkerboard pattern shown in FIG. 8A. In turn, the wavelength of the shear-horizontal wave transmitted by EMAT 16 according to the magnetic field arrangement of FIG. 8B is twice as large as the wavelength of the shear-horizontal wave transmitted by EMAT 16 according to the magnetic field arrangement of FIG. 8A. In FIG. 8C, the magnetic polarization checkerboard pattern is extended by an additional pair of rows compared with the magnetic polarization checkerboard pattern shown in FIG. 8B. In turn, the wavelength of the shear-horizontal wave transmitted by EMAT 16 according to the magnetic field arrangement of FIG. 8C is three times as large as the wavelength of the shear-horizontal wave transmitted by EMAT 16 according to the magnetic field arrangement of FIG. 8A.

FIGS. 9A, 9B, and 9C illustrate schematic diagrams of EMAT 16 in operation to transmit shear-bulk waves at different locations and/or with different beam widths. FIGS. 9A, 9B, and 9C depict a shear-bulk wave (single-element pulse-echo) application. In this condition, only part of electromagnet array 30 is active and only one electrical coil (e.g., only first electrical coil 36) is excited to provide a single point source. The resultant wave is a shear-bulk wave propagating in the z-direction. The combination of active electromagnets 17 and active electrical coil 36 can be used generate a wave at different locations, subject of FIGS. 9A and 9B, and generate a wave with different beam widths, subject of FIG. 9C.

The magnetic field arrangements shown in FIGS. 9A, 9B, and 9C can be modified to make a dual-element EMAT useable for thickness measurements. This is the subject of FIGS. 10A and 10B, which illustrate respective schematic diagrams of EMAT 16 in operation to transmit a shear-bulk wave and to receive any reflected-back portion of the shear-bulk wave. In this condition, one electrical coil (e.g., first electrical coil 36) is used as the ultrasonic wave generator (Tx) and the other electrical coil (e.g., second electrical coil 38) is used for the receiver (Rx). The transmission and reception wave path in the to-be-inspected part 12 is shown in FIG. 10B.

Figure 11A:
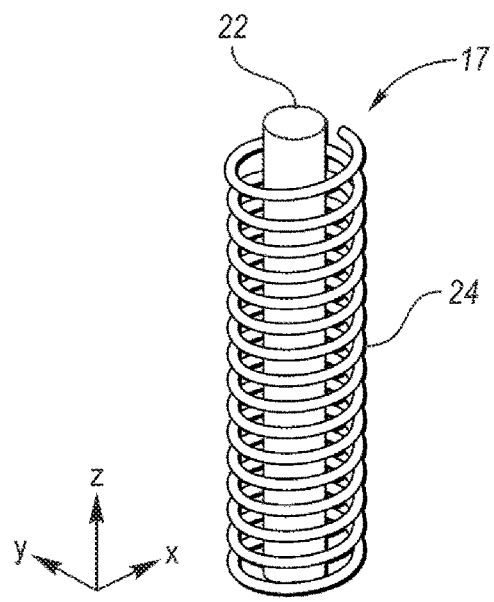
FIG. 11A illustrates a perspective view of the electromagnet, the electromagnet being a single-cylinder core electromagnet in this variation.
Figure 11B:
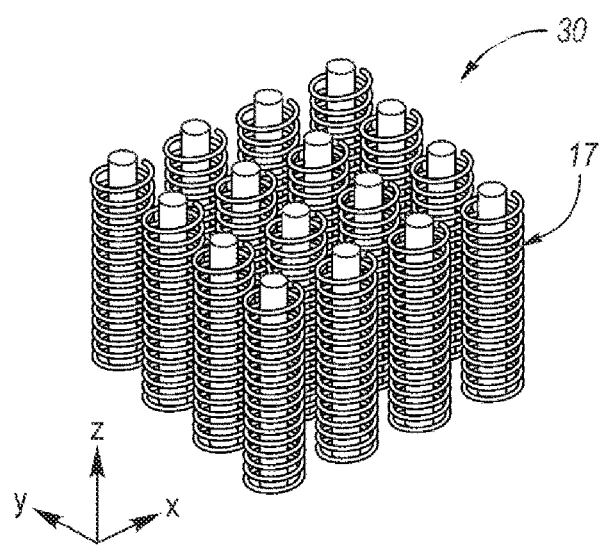
FIG. 11B illustrates a perspective view of the electromagnet array having a plurality of the single-cylinder core electromagnets.

In a variation, electromagnets 17 are single-cylinder core electromagnets. In this case, magnetic core 22 has a cylindrical shape as opposed to a U-shape. FIG. 11A illustrates a perspective view of a single-cylinder core electromagnet. FIG. 11B illustrates a perspective view of electromagnet array 30 having a plurality of single-cylinder core electromagnets 17. As shown, each electromagnet 17 includes a wound coil 24 wrapped around cylindrical-shaped magnetic core 22. Magnetic core 22 includes first and second poles at respective ends of the magnetic core. In correspondence with the cylindrical shape of magnetic core 22, the first and second poles of electromagnets 17 face in opposite directions. In this case, only one of the poles (e.g., first pole 26a) of electromagnets 17 face in the same direction toward to-be-inspected part 12.

Figure 12:
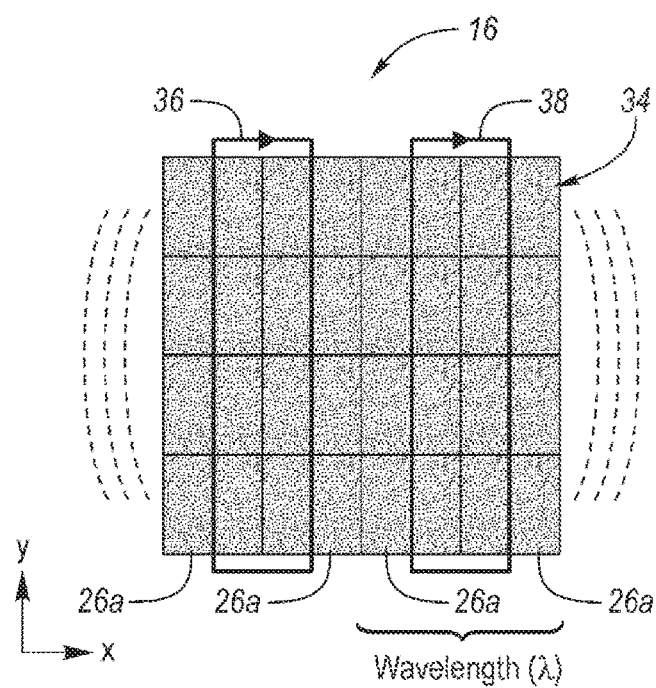
FIG. 12 illustrates a schematic diagram of the EMAT, having the electromagnet array shown in FIG. 11B, in operation to transmit a Lamb wave.

FIG. 12 illustrates a schematic diagram of EMAT 16, having electromagnet array 30 shown in FIG. 11B, in operation to transmit a Lamb wave. With the use of single-cylinder core electromagnets 17 in electromagnet array, the magnetic polarizations of first poles 26a of the electromagnets can all be the same (e.g., first poles 26a all have N magnetic polarization). As such, electromagnet array 17 has the magnetic polarization arrangement shown in FIG. 12. With this magnetic polarization arrangement, electromagnet array 30 thereby generates the bias magnetic field having the requisite pattern required by EMAT 16 for the EMAT to transmit a Lamb wave propagating in the +x and −x directions. In turn, first and second electrical coils 36 and 38 are pulsed with alternating current of the same frequency, amplitude, and phase. The resultant ultrasonic wave transmitted by EMAT 16 is a Lamb wave propagating in the +x and −x directions.

Further, as indicated in FIG. 12, the Lamb wave has a wavelength which is ½ the length of the wavelength of the Lamb wave transmitted by EMAT 16 according to the arrangement shown in FIG. 7A.

Of course, for EMATs in accordance with embodiments, the physical orientation of any of the individual electromagnets 17 in electromagnet array 30 can be rearranged for EMAT to generate different types of bias magnetic fields. One or more electromagnets 17 can be movable between first and second positions to change the physical orientation. In this regard, the EMAT assembly may further include an actuator(s) (not shown) to mechanically move electromagnets 17 between first and second positions. Similarly, the EMAT assembly may further include an actuator (not shown) to mechanically move PCB 32, and thereby first and second electrical coils 36 and 38, relative to electromagnet array 30.

Further, as an exemplary application of the physical orientation of electromagnets 17 in electromagnet array 30, electromagnet array 30 illustrated in FIG. 11B comprising single-cylinder core electromagnets 17 can produce any magnetic polarization patterns shown in FIGS. 6A, 6B, 6C, 7A, 7B, 7C, 9A, 9B, and 9C for the same ultrasonic waves to be generated.

As described, an EMAT in accordance with embodiments has an electromagnet array that is used for the EMAT to generate multiple types of ultrasonic waves. The electromagnet array provides a configurable pattern of magnetic fields for the EMAT. This allows a single EMAT to transmit different types of ultrasonic waves, including Lamb wave, shear-horizontal wave, and shear-bulk wave.

Further, EMATs in accordance with embodiments have been described herein in a transmit mode of operation. Of course, such EMATs may be used in a receive mode of operation. More descriptively, for an EMAT in accordance with embodiments, without changing the energizing pattern of electromagnet array 30 but using first and second electrical coils 36 and 38 as sensing (i.e., receiving) coils without pulsing alternating current, the EMAT functions as an ultrasonic wave receiver. As long as grid pattern 34 of the EMAT is the same for the transmitter and receiver, the transmitter and the receiver are corresponding to the same type of ultrasonic wave. This is due to the reciprocity of wave generation and reception.

As the EMAT has the ability to transmit different types of ultrasonic waves, the EMAT may be used in place of multiple EMATs each having the ability to transmit only one type of ultrasonic wave. As such, the function of multiple EMATs may be combined into just one EMAT in accordance with embodiments. This provides a reduction in size, weight, and cost. Benefits of an EMAT in accordance with embodiments may further include the ability to be used on smaller objects, an extended runtime in battery powered robotic deployment, and a lower economic threshold for potential applications.

Further, unlike a permanent magnet array, the electromagnet array of the EMAT in accordance with embodiments does not have the side effect of attraction and retention of ferromagnetic debris. Collected ferromagnetic debris can foul mechanisms and contaminate nearby electronics and the attraction and retention of ferromagnetic debris is particularly detrimental to robotic involvement. Any ferromagnetic debris collected by the electromagnet array can be released by turning off the electromagnets of the electromagnet array.

Potential users of the EMAT in accordance with embodiments include utility and gas companies with metallic containment vessels and metallic pipe distribution assets, government and commercial concerns with metallic ships and planes, and metal processing facilities.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electro-magnetic acoustic transducer (EMAT) system comprising:
   an electromagnet array including two or more electromagnets, each with a magnetic core;
   a power supply connected to a wound coil wrapped around the magnetic core of each electromagnet;
   a first bias magnetic field generated by the electromagnet array when the wound coil is energized with a first current in a first direction from the power supply; and
   a second bias magnetic field generated by the electromagnet array when the wound coil is energized with a second current in a second direction opposite the first direction from the power supply.

2. The EMAT system of claim 1, wherein the power supply includes a direct current (DC) power supply and an alternating current (AC) power supply.

3. The EMAT system of claim 1 further comprising a controller in communication with the power supply, wherein the controller is designed to control an output power operation.

4. The EMAT system of claim 3, wherein the output power operation includes the first current and the second current used to energize the wound coil.

5. The EMAT system of claim 1, wherein the magnetic core of each electromagnet includes a first pole and a second pole facing a common plane.

6. The EMAT system of claim 1, wherein the magnetic core of each electromagnet includes a first pole and a second pole with a rectangular footprint.

7. The EMAT system of claim 1, wherein the magnetic core of each electromagnet includes a first pole and a second pole with a square footprint.

8. The EMAT system of claim 1, wherein the first current is a positive electric current and the second current is a negative electric current.

9. The EMAT system of claim 1, wherein the magnetic core of each electromagnet includes a first pole and a second pole designed to conform to a curvature of a non-planar surface or form an arc segment conforming to a curvature of a non-planar surface.

10. A method of controlling an electro-magnetic acoustic transducer (EMAT) system comprising:
    energizing a wound coil wrapped around a magnetic core of each of two or more electromagnets of an electromagnet array using a power supply of the EMAT system;
    providing a first current at a first time to the wound coil using the power supply;
    generating a first bias magnetic field based on the first current in the first direction;
    providing a second current in the second direction opposite the first direction at a second time to the wound coil using the power supply; and
    generating a second bias magnetic field based on the second current.

11. The method of controlling the EMAT system of claim 10 further comprising the step of:
    controlling the first current and the second current using a controller of the EMAT system.

12. The method of controlling the EMAT system of claim 10 further comprising the steps of:

generating a first ultrasonic wave based on the first bias magnetic field; and generating a second ultrasonic wave based on the second bias magnetic field.

13. The method of controlling the EMAT system of claim 10, wherein energizing the wound coil with the first current causes a first pole and a second pole of the magnetic cores of the electromagnetic array to have a checkerboard magnetic polarization pattern.

14. The method of controlling the EMAT system of claim 10, wherein energizing the wound coil with the second current causes a first pole and a second pole of the magnetic cores of the electromagnetic array to have a non-checkerboard magnetic polarization pattern.

15. The method of controlling the EMAT system of claim 10, wherein providing the first current includes providing a negative current using the power supply.

16. The method of controlling the EMAT system of claim 10, wherein providing the second current includes providing a positive current using the power supply.

* * * * *